United States Patent
Utsunomiya et al.

(10) Patent No.: US 11,323,417 B2
(45) Date of Patent: May 3, 2022

(54) NETWORK MANAGEMENT APPARATUS, NETWORK MANAGEMENT METHOD, AND NON-TRANSITORY COMPUTER-READABLE STORAGE MEDIUM

(71) Applicant: FUJITSU LIMITED, Kawasaki (JP)

(72) Inventors: Takuma Utsunomiya, Tokyo (JP); Naoki Oguchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 262 days.

(21) Appl. No.: 16/286,732

(22) Filed: Feb. 27, 2019

(65) Prior Publication Data
US 2019/0273721 A1 Sep. 5, 2019

(30) Foreign Application Priority Data

Mar. 1, 2018 (JP) .............................. JP2018-036399

(51) Int. Cl.
*H04L 61/2503* (2022.01)
*H04L 29/06* (2006.01)

(52) U.S. Cl.
CPC ...... *H04L 63/0263* (2013.01); *H04L 63/0236* (2013.01); *H04L 63/101* (2013.01); *H04L 61/2503* (2013.01)

(58) Field of Classification Search
CPC ............... H04L 63/0263; H04L 63/101; H04L 63/0236; H04L 61/2503; H04L 63/20
See application file for complete search history.

(56) References Cited

U.S. PATENT DOCUMENTS

| 8,484,322 B2* | 7/2013 | Ogawa | H04L 29/12207 709/221 |
| 8,800,021 B1* | 8/2014 | Swaminathan | H04L 63/0209 726/13 |
| 2003/0051165 A1* | 3/2003 | Krishnan | H04L 63/0227 726/4 |

(Continued)

FOREIGN PATENT DOCUMENTS

| JP | 2002-507295 | 3/2002 |
| JP | 2008-219419 | 9/2008 |

(Continued)

OTHER PUBLICATIONS

Chi-Shin Chao, "A Visualized Internet Firewall Rule Validation System", APNOMS 2007, pp. 364-374 (11 pages).

*Primary Examiner* — Cheng-Feng Huang
(74) *Attorney, Agent, or Firm* — Fujitsu Patent Center

(57) ABSTRACT

A network management apparatus configured to obtain multiple rules that each control communication in accordance with an address range of a packet, divide a full set of the address range of the multiple rules into multiple subsets that are mutually disjoint in accordance with inclusion relations of the address range among the multiple rules, extract, with respect to each rule of the multiple rules, one or more subsets that are included in the address range from the multiple subsets, and determine, with respect to each rule of the multiple rules, an inclusion relation of the one or more subsets between a particular rule and another rule of the multiple rules that is assigned higher priority than that of the particular rule and determine disposition for each of the multiple rules in accordance with a determination result of the inclusion relation of the one or more subsets.

10 Claims, 11 Drawing Sheets

(56) References Cited

U.S. PATENT DOCUMENTS

| | | | |
|---|---|---|---|
| 2006/0174337 A1* | 8/2006 | Bernoth | H04L 63/0263 726/11 |
| 2008/0215518 A1* | 9/2008 | Matsuda | H04L 63/02 706/47 |
| 2009/0138960 A1* | 5/2009 | Felty | G06N 5/025 726/14 |
| 2010/0257576 A1* | 10/2010 | Valente | H04L 63/102 726/1 |
| 2012/0110656 A1* | 5/2012 | Santos | H04L 63/0263 726/13 |
| 2014/0075498 A1* | 3/2014 | Porras | H04L 63/107 726/1 |
| 2014/0317684 A1* | 10/2014 | Porras | H04L 63/20 726/1 |
| 2014/0325635 A1* | 10/2014 | Swaminathan | H04L 63/0263 726/13 |
| 2018/0270266 A1* | 9/2018 | Zoldi | G06Q 10/0635 |

FOREIGN PATENT DOCUMENTS

| | | |
|---|---|---|
| JP | 2011-060249 | 3/2011 |
| WO | 98/54644 | 12/1998 |
| WO | 2006/090781 | 8/2006 |

\* cited by examiner

FIG. 5

FIG. 6A

| PEC NUMBER | ADDRESS RANGE |
|---|---|
| 1 | [[10.45.232.0/20,*]]-[[10.45.224.0/20,*]] |
| 2 | [[*,10.56.64.0/18]]-[[*,[[10.45.128.0/17,10.56.64.0/18]] |
| 3 | [[*,10.56.64.0/24]]-[[10.45.128.0/17,10.56.64.0/24]] |
| 4 | [[*,10.56.148.0/23]]-[[10.45.128.0/17,10.56.148.0/23]] |
| 5 | [[*,10.56.148.0/23]]-[[10.45.128.0/17,10.56.148.0/23]] |
| 6 | [[*,10.56.128.0/18]]-[[*,10.56.144.0/20]] |
| 7 | [[10.45.224.0/20,10.45.0.0/32]]-[[10.45.232.0/24,10.45.0.0/32]] |
| 8 | [[10.45.224.0/20,10.56.64.0/18]]-[[10.45.232.0/24,10.56.64.0/18]] |
| 9 | [[10.45.224.0/20,10.56.64.0/24]]-[[10.45.232.0/24,10.56.64.0/24]] |
| 10 | [[10.45.224.0/20,10.56.0.0/32]]-[[10.45.232.0/24,10.56.0.0/32]] |
| 11 | [[10.45.224.0/20,10.56.128.0/18]]-[[10.45.232.0/24,10.56.128.0/18]] |
| 12 | [[10.45.224.0/20,10.56.144.0/20]]-[[10.45.232.0/24,10.56.144.0/20]] |
| 13 | [[10.45.232.0/24,*]]-[[10.45.232.0/24,10.45.0.0/32]]-[[10.45.232.0/24,10.56.64.0/18]]-[[10.45.232.0/24,10.56.0.0/32]]-[[10.45.232.0/24,10.56.128.0/18]] |
| 14 | [[10.45.224.0/20,10.56.148.0/23]]-[[10.45.232.0/24,10.56.148.0/23]] |
| 15 | [[10.45.232.0/24,10.45.0.0/32]] |
| 16 | [[10.45.232.0,10.56.64.0/18]]-[[10.45.232.0/24,10.56.64.0/18]] |
| 17 | [[10.45.232.0/24,10.56.64.0/24]] |

FIG. 6B

| PEC NUMBER | ADDRESS RANGE |
|---|---|
| 18 | [[10.45.232.0/24,10.56.0.0/32]] |
| 19 | [[10.45.232.0/24,10.56.128.0/18]]-[[10.45.232.0/24,10.56.144.0/20]] |
| 20 | [[10.45.232.0/24,10.56.144.0/20]]-[[10.45.232.0/24,10.56.148.0/23]] |
| 21 | [[10.45.128.0/17,*]]-[[10.45.224.0/20,*]]-[[10.45.128.0/17,10.45.0.0/32]]-[[10.45.128.0/17,10.56.64.0/18]]-[[10.45.128.0/7,10.56.128.0/18]] |
| 22 | [[10.45.232.0/24,10.56.148.0/23]] |
| 23 | [[10.45.224.0/20,*]]-[[10.45.224.0/20,10.45.0.0/32]]-[[10.45.224.0/20,10.56.64.0/18]]-[[10.45.224.0/20,10.56.128.0/18]] |
| 24 | [[10.45.128.0/17,10.45.0.0/32]]-[[10.45.224.0/20,10.45.0.0/32]] |
| 25 | [[10.45.128.0/17,10.56.64.0/18]]-[[10.45.224.0/20,10.56.64.0/18]] |
| 26 | [[10.45.128.0/17,10.56.64.0/24]]-[[10.45.224.0/20,10.56.64.0/24]] |
| 27 | [[10.45.128.0/17,10.56.0.0/32]]-[[10.45.224.0/20,10.56.0./32]] |
| 28 | [[10.45.128.0/17,10.56.128.0/18]]-[[10.45.224.0/20,10.56.128.0/18]]-[[10.45.128.0/17,10.56.64.0/24]] |
| 29 | [[10.45.128.0/17,10.56.144.0/20]]-[[10.45.224.0/20,10.56.144.0/20]]-[[10.45.128.0/17,10.56.144.0/20]] |
| 30 | [[10.45.128.0/17,10.56.148.0/23]]-[[10.45.224.0/20,10.56.148.0/23]]-[[10.45.128.0/17,10.56.148.0/23]] |

FIG. 7

FIREWALL AT SITE#1

| SETTING NAME | PRIORITY | ACTION | PEC NUMBER |
|---|---|---|---|
| FW1-1 | 1 | DENY/DROP | 2,3,8,9,16,17,25,26 |
| FW1-2 | 2 | PERMIT | 3,9,17,26 |
| FW1-3 | 3 | PERMIT | 4,14,22,30 |
| FW1-4 | 4 | PERMIT | 4,5,12,14,20,22,29,30 |
| FW1-5 | 5 | PERMIT | 4,5,6,11,12,14,19,20,22,28,29,30 |

FIREWALL AT SITE#2

| SETTING NAME | PRIORITY | ACTION | PEC NUMBER |
|---|---|---|---|
| FW2-1 | 1 | DENY/DROP | 3,9,17,26 |
| FW2-2 | 2 | DENY/DROP | 1,7,8,9,10,11,12,13,14,15,16,17,18,19,20,22,23 |
| FW2-3 | 3 | DENY/DROP | 13,15,16,17,18,19,20,22 |
| FW2-4 | 4 | PERMIT | 7,8,9,10,11,12,13,14,15,16,17,18,19,20,21,22,23,24,25,26,27,28,29,30 |

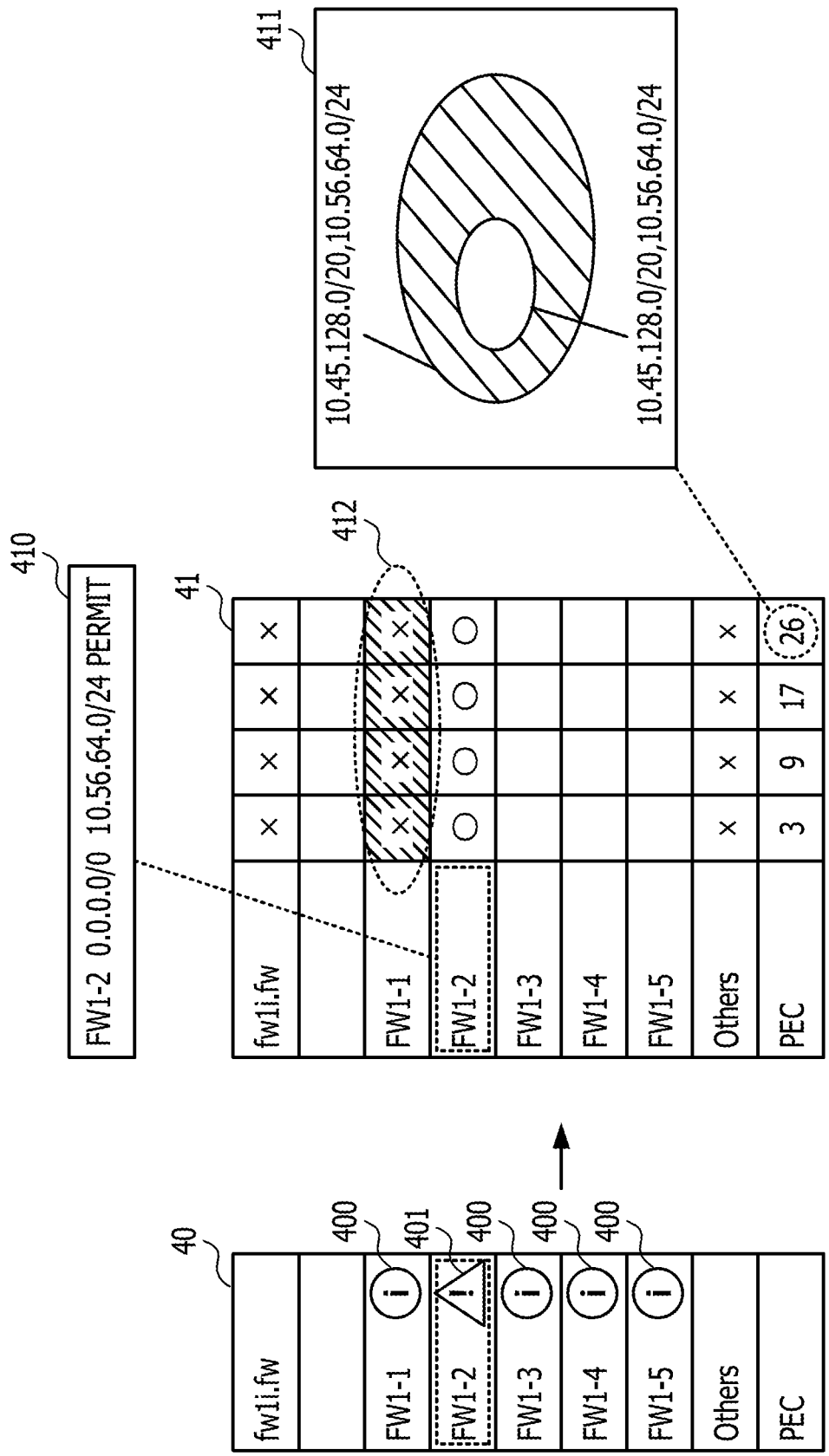

NETWORK MANAGEMENT APPARATUS, NETWORK MANAGEMENT METHOD, AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2018-36399, filed on Mar. 1, 2018, the entire contents of which are incorporated herein by reference.

FIELD

The embodiment discussed herein is related to a network management apparatus, a network management method, a non-transitory computer-readable storage medium storing a program, and a network system.

BACKGROUND

With the spread of communication technologies, such as cloud services, fifth generation (5G) communication, and the Internet of things (IoT), network connection configuration has become more complex, resulting in increasing demand for taking security measures, such as deployment of firewalls, in networks in a variety of sites such as offices, retail establishments, and factories. Concerning firewalls, multiple rules for controlling communication in accordance with conditions such as a source Internet Protocol (IP) address and a destination IP address of packets are set for the firewall as security policies, as described in, for example, patent literature 1. Another example is a technology for validating rules constituting security policies by visually presenting the rules as described in non-patent literature 1. Examples of the related art include Japanese National Publication of International Patent Application No. 2002-507295.

As the number of firewalls increases, the workload for setting security policies increases, and thus rules may overlap or contradictions among rules may occur. In this respect, it is possible to simply check inclusion relations of conditions among rules by using, for example, the technology described in non-patent literature 1. However, to determine whether to correct rules, further operation of examining setting details of rules is desired. This demands special knowledge of networking, and thus validation of security policies is not straightforward.

In view of the above-described situation, it is desired to provide a network management apparatus, a network management method, a non-transitory computer-readable storage medium storing a program for managing a network, and a network system that facilitate validation of security policies of network devices.

SUMMARY

According to an aspect of the embodiments, A network management apparatus includes a memory and a processor coupled to the memory and configured to obtain multiple rules that each control communication in accordance with an address range of a packet, divide a full set of the address range of the multiple rules into multiple subsets that are mutually disjoint in accordance with inclusion relations of the address range among the multiple rules, extract, with respect to each rule of the multiple rules, one or more subsets that are included in the address range from the multiple subsets, determine, with respect to each rule of the multiple rules, an inclusion relation of the one or more subsets between a particular rule and another rule of the multiple rules that is assigned higher priority than that of the particular rule and determine disposition for each of the multiple rules in accordance with a determination result of the inclusion relation of the one or more subsets, and output image data indicating, with respect to each rule of the multiple rules, the disposition and the inclusion relation of the one or more subsets.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 illustrates an example of an access control list (ACL) information DB;

FIGS. 6A and 6B illustrate examples of a PEC database;

FIG. 7 illustrates an example of an ACL information management table;

FIG. 10 illustrates a display example of a screen of a display device.

DESCRIPTION OF EMBODIMENTS

Figure 1:
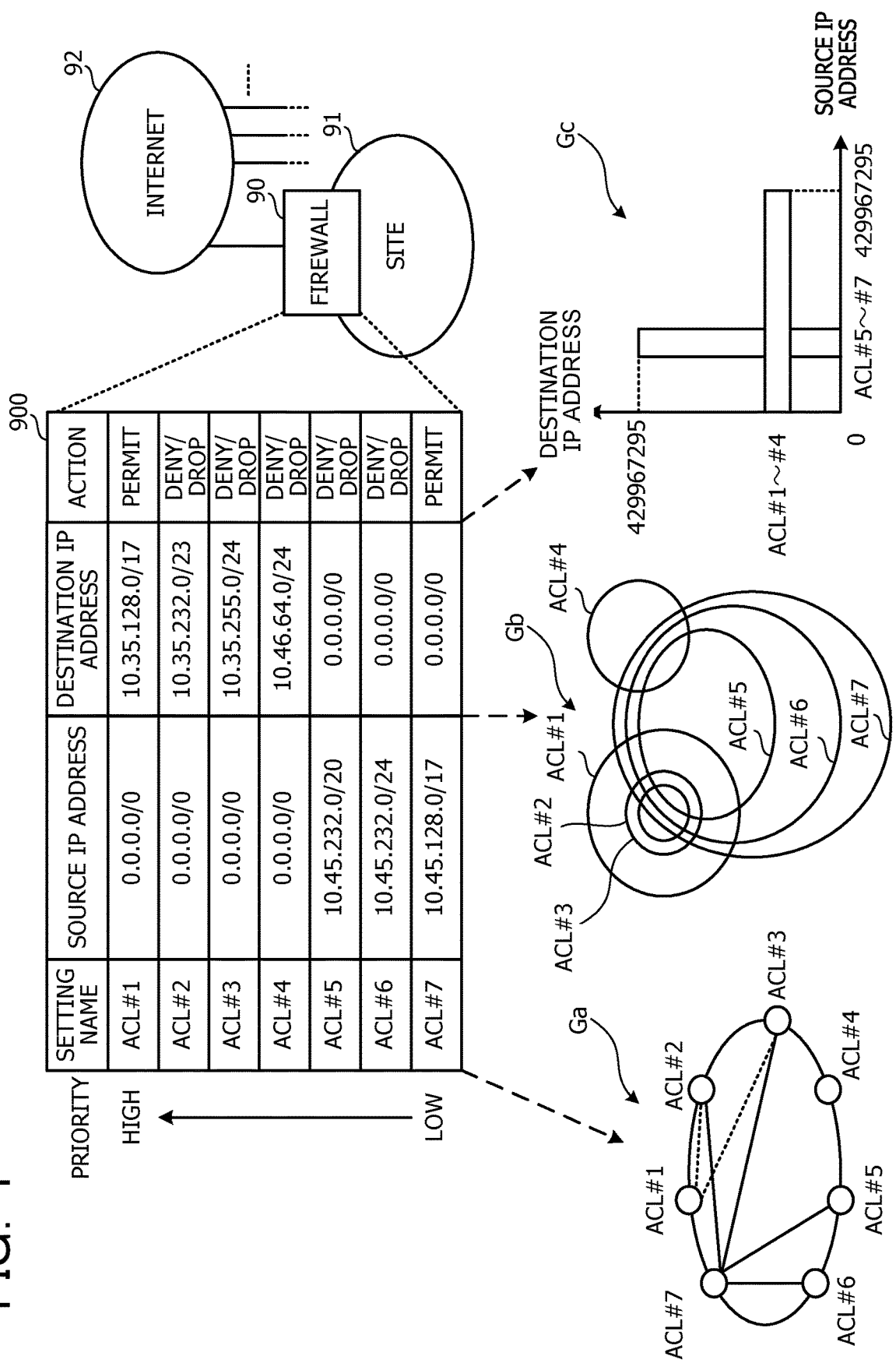
FIG. 1 illustrates a comparative example of methods for validating security policies.

FIG. 1 illustrates a comparative example of methods for validating security policies. A firewall device (hereinafter referred to as a firewall) 90 is installed at a node connected to the Internet 92, each node corresponding to a respective site 91.

In the firewall 90, an ACL 900 containing multiple rules for controlling communication via the Internet 92 is set as security policies. The ACL 900 contains, for example, a setting name, a source IP address, a destination IP address, and an action. The source IP address and the destination IP address are an example of an address, and a destination address (DA) and a source address (SA) of an Ethernet frame may be, for example, used as addresses. It is also possible to combine application source port number with source IP address and combine destination port number with destination IP address.

The setting name is a name of an individual rule, and ACL #1 to ACL #7 are set as an example. The source IP address indicates the source of a packet. When the source IP address is set as "0.0.0.0/0", the source IP address corresponds to all IP addresses. The destination IP address indicates the destination of a packet. When the destination IP address is set as "0.0.0.0/0", the destination IP address corresponds to all IP addresses.

The action indicates processing for packets that satisfy a given condition of the source IP address and the destination IP address. When the action is set as PERMIT, a packet satisfying a given condition is transmitted to the local network within the site 91 via the Internet 92 through the firewall 90. When the action is set as DENY/DROP, a packet originating from the Internet 92 and satisfying a given condition is discarded without passing through the firewall 90. The action is an example of an action setting that indicates permission or denial of communication of corresponding packets.

In the ACL 900, priority is assigned to rules in the order from the top of the ACL 900 (the top of FIG. 1). In this case, the highest priority is assigned to the rule of the setting name ACL #1 and the lowest priority to the rule of the setting name ACL #7. The firewall 90 applies rules to a packet sequentially in the priority order. Therefore, for example, when the source IP address and the destination IP address of a rule assigned a higher priority coincide with those of another rule assigned a lower priority, the rule assigned a lower priority is not applied to packets.

Example of methods for validating security policies include a technology in which the ACL 900 is visually represented, as illustrated in diagrams in FIG. 1 with reference characters Ga to Gc.

The diagram with the reference characters Ga illustrates an example of the technology according to the aforementioned non-patent literature 1. In the figure, rules denoted by setting names ACL #1 to ACL #7 are presented on the circumference of an ellipse sequentially from ACL #1 to ACL #7, and the rules are connected by lines whose type denotes the relation between the connected rules. For example, a solid line denotes that a rule assigned a higher priority includes the entire range of the source IP address and the destination IP address of another rule assigned a lower priority, while a dotted line denotes that a rule assigned a higher priority includes part of the range of the source IP address and the destination IP address of another rule assigned a lower priority.

With this technology, it is possible to simply check inclusion relations of conditions among rules. However, to determine whether to correct rules, further operation of examining the ACL 900 is desired. This demands special knowledge of networking, and thus validation of security policies is not straightforward.

The diagram with the reference characters Gb illustrates an example of a technology for visualizing the ACL 900 by using a Venn diagram. This technology enables check of overlapping relations of the source IP address and the destination IP address among the rules having the setting names ACL #1 to ACL #7. However, since the priority order of the rules is not displayed, further operation of examining the ACL 900 is desired, and thus validation of security policies is not straightforward.

The diagram with the reference characters Gc illustrates an example of a technology for visualizing the ACL 900 by using a two-dimensional graph. In this technology, with respect to each of the setting names ACL #1 to ACL #7, the range of the source IP address is indicated on the horizontal axis, and that of the destination IP address is indicated on the vertical axis. The value of the source IP address and the value of the destination IP address are changed to decimal numbers and plotted on the graph.

Concerning the rules having the setting names ACL #1 to ACL #4, because the range of the source IP addresses is broader than the range of the destination IP addresses, the displayed area extends in the horizontal axis direction.

Concerning the rules having the setting names ACL #5 to ACL #7, because the range of the destination IP addresses is broader than the range of the source IP addresses, the displayed area extends in the vertical axis direction.

Hence, with this technology, the areas representing multiple respective rules are intricately displayed in a relatively small region, and thus, it is difficult to check overlapping ranges of the source IP addresses and the destination IP addresses among the rules. Therefore, validation of security policies is not straightforward.

A network management apparatus of an embodiment divides the entire range of the source IP addresses and the destination IP addresses of the rules in the ACL 900 into sets of addresses, each of which is referred to as a PEC, and outputs image data indicating disposition for the respective rules and inclusion relations of the address ranges among the rules by performing processing for each PEC unit. The PEC is a set of addresses across a range that does not overlap the ranges of other PECs and is used as an element for indicating the range of the source IP address and the destination IP address of each rule in the ACL 900.

An example of the PEC is described below. In the following description, an address range denotes the range in an address space that is defined by the range of a source IP address and the range of a destination IP address.

Figure 2:
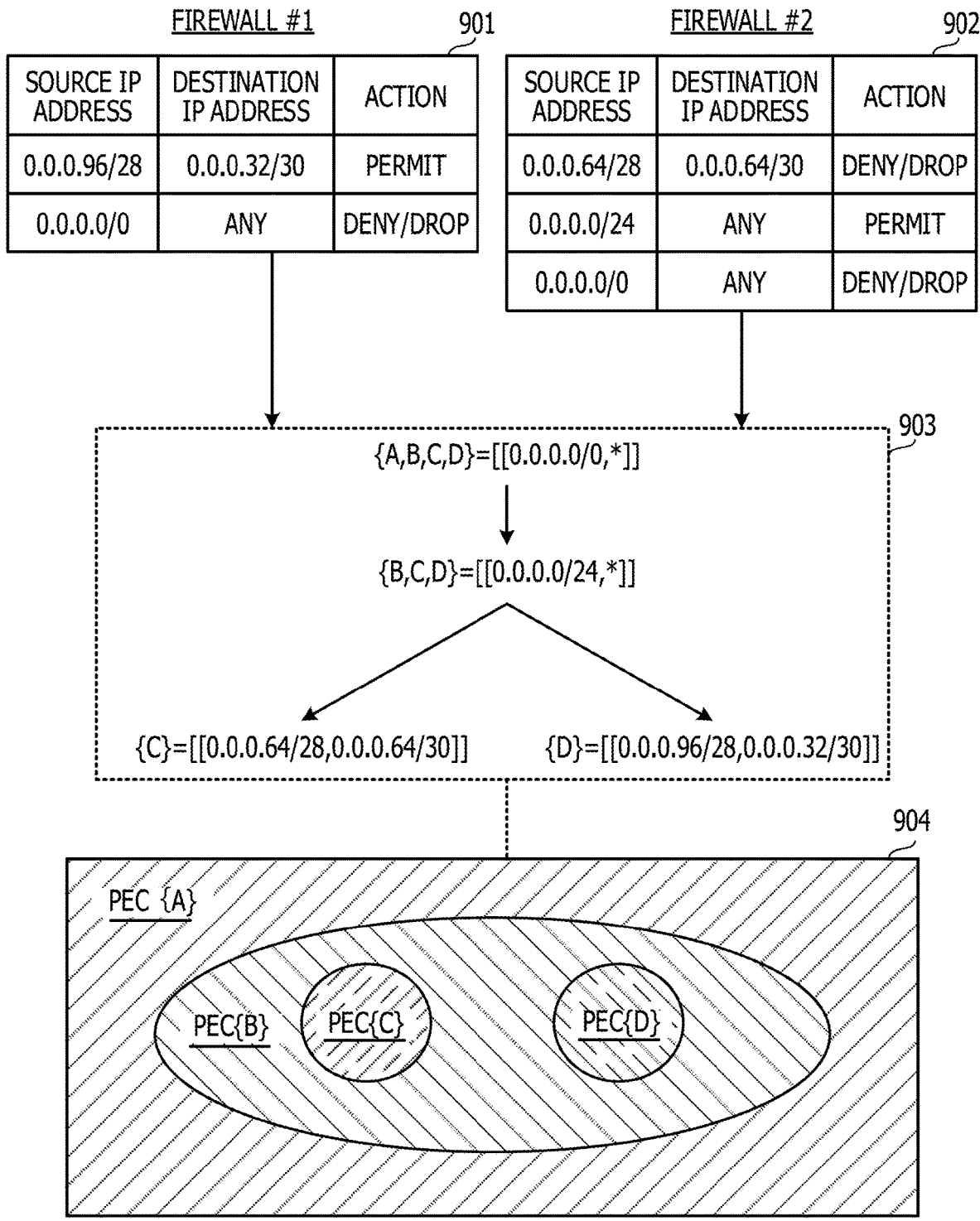
FIG. 2 illustrates an example of generation of packet equivalence classes (PECs)

FIG. 2 illustrates an example of PEC generation. The network management apparatus generates the PECs from an ACL 901 of a firewall #1 and from an ACL 902 of a firewall #2 that are included in an entire network targeted for management by the network management apparatus.

The network management apparatus defines a full set of an address range (an entire address space universe) as the source IP address 0.0.0.0/0 and the destination IP address ANY (denoting all addresses) (the firewalls #1 and #2), which is the widest address range in the ACLs 901 and 902. The network management apparatus analyzes the inclusion relations of the address ranges among the rules in the ACLs 901 and 902 and generates PEC{A} to PEC{D} from the analysis result as illustrated in a diagram with a reference number 903.

The network management apparatus detects that the full set of the address range of the rules [[0.0.0.0/0,*]] (*: Don't care) includes the address range [[0.0.0.0/24,*]] composed of the source IP address 0.0.0.0/24 and the destination IP address ANY (the firewall #2), which are the second broadest address range, as indicated by an arrow. The network management apparatus detects that the address range [[0.0.0.0/24,*]] includes the address range [[0.0.0.96/28, 0.0.0.32/30]] composed of the source IP address 0.0.0.96/28 and the destination IP address 0.0.0.32/30 (the firewall #1) as indicated by an arrow.

Furthermore, the network management apparatus detects that the address range [[0.0.0.0/24,*]] includes the address range [[0.0.0.64/28, 0.0.0.64/30]] composed of the source IP address 0.0.0.64/28 and the destination IP address 0.0.0.64/30 (the firewall #2) as indicated by an arrow. No overlapping range exists between the address range [[0.0.0.96/28, 0.0.0.32/30]] and the address range [[0.0.0.64/28, 0.0.0.64/30]], and thus, they are mutually disjoint. The network management apparatus generates the PEC{A} to PEC{D} as mutually disjoint sets in accordance with the inclusion relations of the address ranges.

In FIG. 2, diagram 904 is a Venn diagram illustrating the inclusion relations of the address ranges among the rules in the ACLs 901 and 902. The PEC{A} to PEC{D} are differentiated by different types of hatching. Lines defining individual sets of the address ranges of the rules are boundary lines of the PEC{A} to PEC{D}.

The full set [[0.0.0.0/0,*]] including all address ranges of the rules in turn includes all of the PEC{A} to PEC{D}. The address range [[0.0.0.0/24,*]] includes the PEC{B} to PEC{D}. The address range [[0.0.0.64/28, 0.0.0.64/30]] and the address range [[0.0.0.96/28, 0.0.0.32/30]], which are both mutually disjoint sets, respectively correspond to the PEC{C} and the PEC{D}.

$$PEC\{A\}=[[0.0.0.0/0,*]]-[[0.0.0.0/24,*]] \quad (1)$$

$$PEC\{B\}=[[0.0.0.0/24,*]]-[[0.0.0.64/28,0.0.0.64/30]]-[[0.0.0.96/28,0.0.0.32/30]] \quad (2)$$

$$PEC\{C\}=[[0.0.0.64/28,0.0.0.64/30]] \quad (3)$$

$$PEC\{D\}=[[0.0.0.96/28,0.0.0.32/30]] \quad (4)$$

The network management apparatus generates the PEC{A} to PEC{D} in accordance with the above equations (1) to (4). In equations (1) and (2), "−" denotes subtracting an address range from another address range. Hence, the PEC may be expressed such that the PEC is obtained by subtracting the range of the prefix (for example, /30 or /24) of an IP address from the range of the prefix of another IP address.

In such a manner, the network management apparatus divides the full set of address ranges of rules into multiple PECs in accordance with inclusion relations of the address ranges among the rules. The multiple PECs are an example of mutually disjoint multiple subsets.

As a result, the network management apparatus is able to treat the address range of each rule as a set of one or more PECs, and the network management apparatus may easily determine inclusion relations of the address ranges among the rules. The network management apparatus outputs information about the inclusion relations of the address ranges on a screen so that a user may easily validate security policies.

Figure 3:
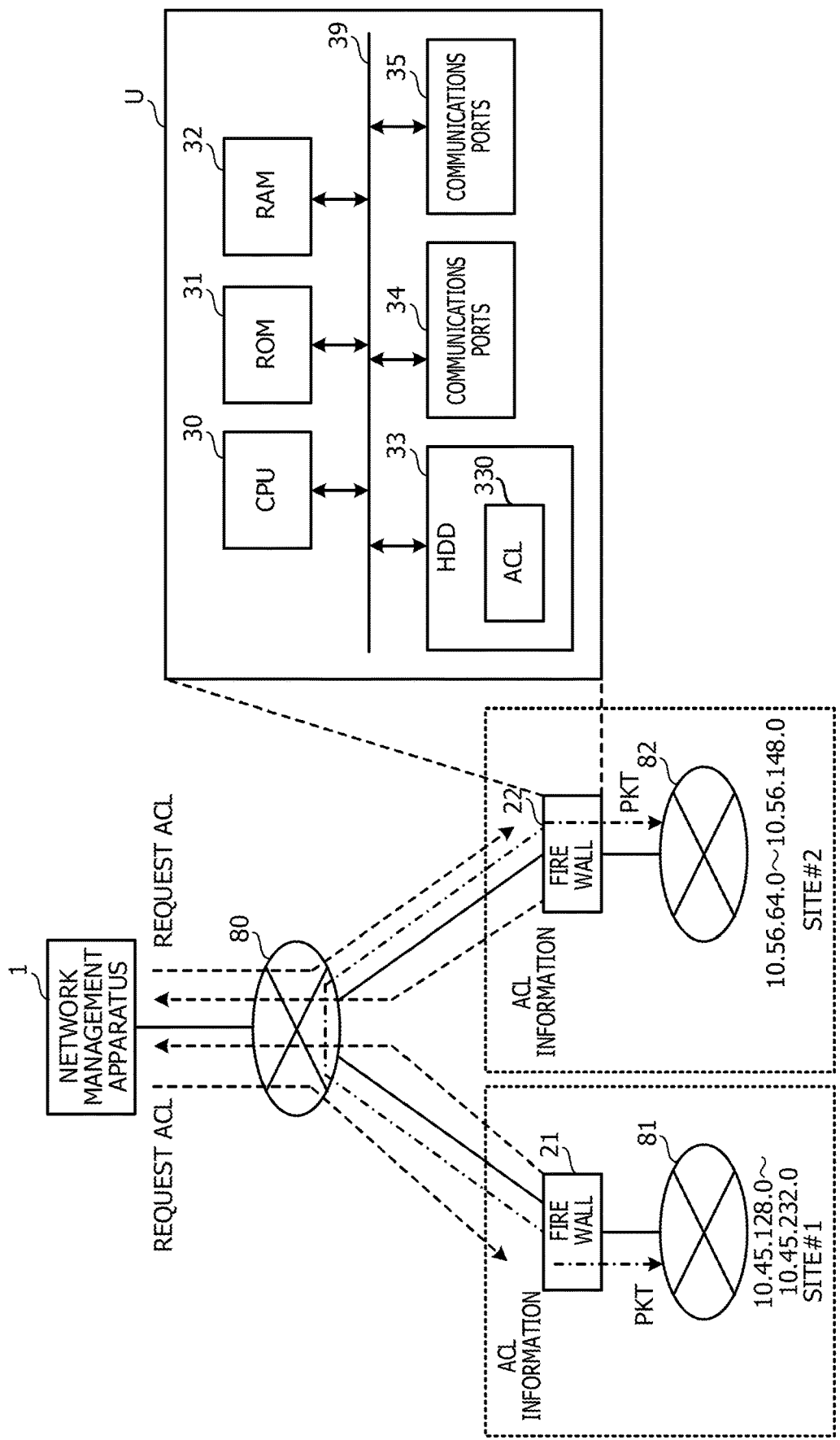
FIG. 3 illustrates an example of a configuration of a network system.

FIG. 3 illustrates an example of a configuration of a network system. The network system includes a network management apparatus 1 and firewalls 21 and 22. The network management apparatus 1 is connected to the firewalls 21 and 22 via an intranet 80. The network management apparatus 1 and the firewalls 21 and 22 communicate with one another by using a wired or wireless connection. The firewalls 21 and 22 are examples of network devices. Any devices, such as routers, may be utilized as network devices.

The firewall 21 is deployed at a site #1 and connected to a subnetwork 81 at the site #1. The firewall 22 is deployed at a site #2 and connected to a subnetwork 82 at the site #2. For example, the IP addresses 10.45.128.0 to 10.45.232.0 are used for the subnetwork 81 at the site #1, and the IP addresses 10.56.64.0 to 10.56.148.0 are used for the subnetwork 82 at the site #2.

The firewall 21 controls, by using an ACL, a packet PKT that is transmitted from the subnetwork 82 at the site #2 via the intranet 80 to the subnetwork 81. The firewall 22 controls, by using an ACL, the packet PKT that is transmitted from the subnetwork 81 at the site #1 via the intranet 80 to the subnetwork 82. As the packet PKT, an IP packet is used as an example, but the packet PKT is not limited to an IP packet and an Ethernet (registered trademark) frame may be used.

In FIG. 3, block diagram U illustrates an example of a configuration of the firewall 22. The other firewall, firewall 21, has the same configuration as that of the firewall 22.

The firewall 22 includes a central processing unit (CPU) 30, a read-only memory (ROM) 31, a random access memory (RAM) 32, a hard disk drive (HDD) 33, and communications ports 34 and 35. The CPU 30 is coupled to the ROM 31, the RAM 32, the HDD 33, and the communications ports 34 and 35 via a bus 39 in such a manner as to input and output signals to and from one another.

The ROM 31 stores a program in accordance with which the CPU 30 operates. The RAM 32 functions as working memory of the CPU 30. The communications port 34 is used for communication with the subnetwork 82, and the communications port 35 is used for communication with the network management apparatus 1 and the subnetwork 81 via the intranet 80. The communications ports 34 and 35 are each, for example, a wireless local area network (LAN) card or a network interface card (NIC).

The HDD 33, which is an example of a memory unit, stores an ACL 330 containing multiple rules for individually controlling communication in accordance with the address range of the packet PKT as described above. The CPU 30, which is an example of a control unit, controls communication of the packet PKT in accordance with the rules in the ACL 330.

When the source IP address and the destination IP address of the packet PKT that is input via the communications port 35 satisfies the condition of any one of the rules, the CPU 30 causes the packet PKT to be passed or discarded in accordance with the action corresponding to the satisfied rule.

The network management apparatus 1 requests the ACL 330 from the firewalls 21 and 22 (refer to request ACL). In response to the request, the firewalls 21 and 22 transmit information about the ACL 330 (refer to ACL information) to the network management apparatus 1.

Figure 4:
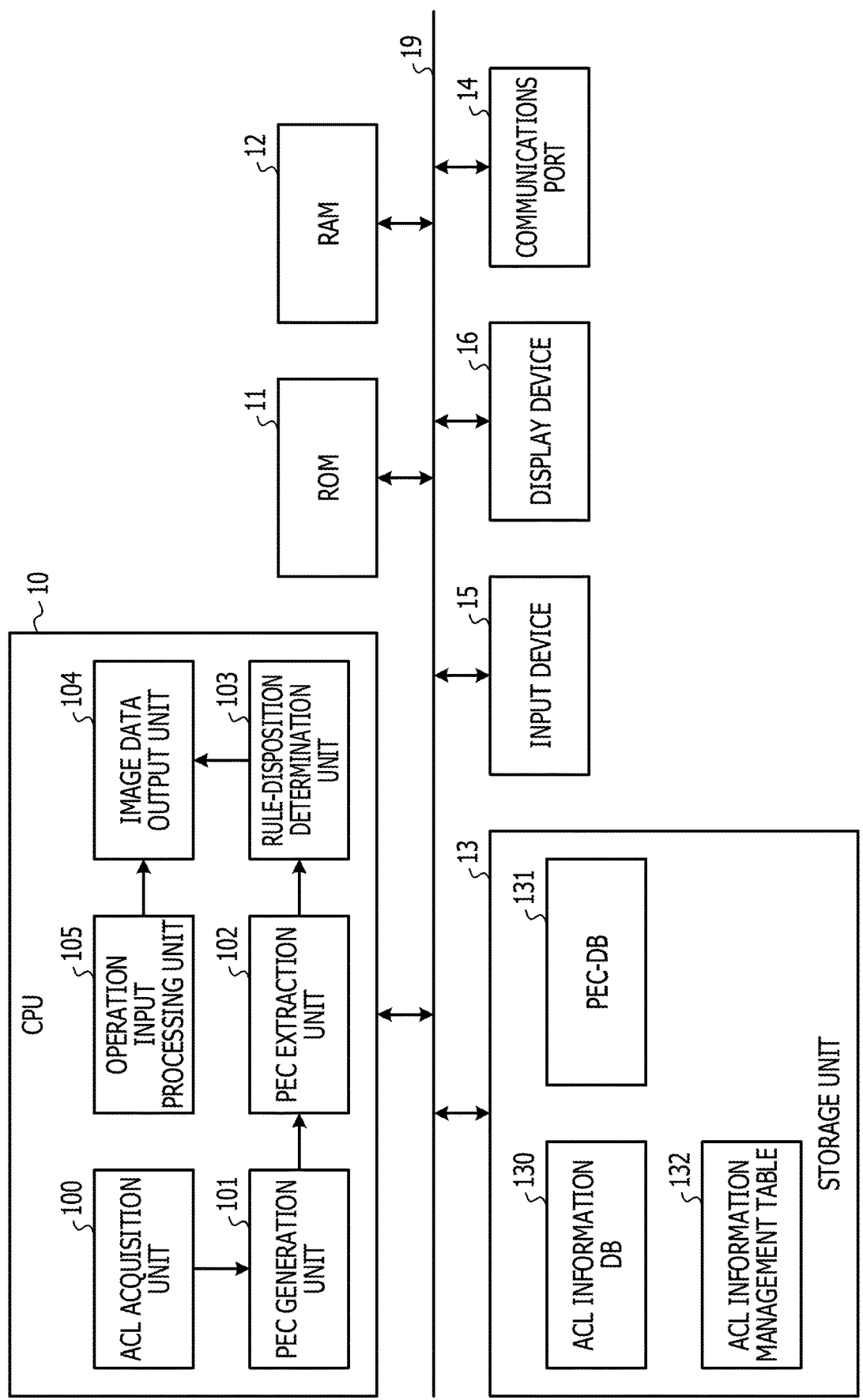
FIG. 4 illustrates an example of a configuration of a network management apparatus.

FIG. 4 illustrates an example of a configuration of the network management apparatus 1. The network management apparatus 1 includes a CPU 10, a ROM 11, a RAM 12, a storage unit 13, a communications port 14, an input device 15, and a display device 16. The CPU 10 is coupled to the ROM 11, the RAM 12, the storage unit 13, the communications port 14, the input device 15, and the display device 16 via a bus 19 in such a manner as to input and output signals to and from one another. The CPU 10 is an example of a computer.

The ROM 11 stores a program in accordance with which the CPU 10 operates. The program includes a network management program for performing a network management method. The RAM 12 functions as working memory of the CPU 10. The communications port 14 is, for example, a wireless LAN card or a NIC and used for communication with the firewalls 21 and 22.

The input device 15 is used for inputting information into the network management apparatus 1. Examples of the input device 15 include a keyboard, a mouse, and/or a touch panel. The input device 15 outputs the input information to the CPU 10 via the bus 19.

The display device 16 outputs information about the network management apparatus 1. Examples of the display device 16 include a display and/or a touch panel. The display device 16 obtains information from the CPU 10 via the bus 19 and outputs the information.

By reading the program stored in the ROM 11, the CPU 10 functions as an ACL acquisition unit 100, a PEC generation unit 101, a PEC extraction unit 102, a rule-disposition determination unit 103, an image data output unit 104, and an operation input processing unit 105. The ACL acquisition unit 100, the PEC generation unit 101, the PEC extraction unit 102, the rule-disposition determination unit 103, the image data output unit 104, and the operation input processing unit 105 may each be, for example, a circuit constituted by a hardware device such as a field programmable gate array (FPGA) or an application specified integrated circuit (ASIC).

The storage unit 13 stores an ACL information database (DB) 130, a PEC-DB 131, and an ACL information management table 132. The storage unit 13 may be provided separately from the network management apparatus 1.

The ACL acquisition unit 100 obtains the ACL information from the firewalls 21 and 22 via the communications port 14. The ACL acquisition unit 100, which is an example of an acquisition unit, obtains multiple rules for individually controlling communication. The ACL acquisition unit 100 records the ACL information in the ACL information DB 130. After having completed the recording of the ACL information, the ACL acquisition unit 100 notifies the PEC generation unit 101 of the completion. The PEC generation unit 101 starts processing in response to the notification.

FIG. 5 illustrates an example of the ACL information DB 130. The ACL information DB 130 stores the ACL information with respect to each of the firewalls 21 and 22.

In the ACL information DB 130, rules having the setting names FW1-1 to FW1-5 are recorded for the firewall 21 at the site #1, and rules having the setting names FW2-1 to FW2-4 are recorded for the firewall 22 at the site #2. In the ACL information for the firewall 21 at the site #1, the highest priority is assigned to the rule having the setting name FW1-1, and the lowest priority is assigned to the rule having the setting name FW1-5. In the ACL information for the firewall 22 at the site #2, the highest priority is assigned to the rule having the setting name FW2-1, and the lowest priority is assigned to the rule having the setting name FW2-4.

Referring back to FIG. 4, the PEC generation unit 101 generates multiple PECs from the information recorded in the ACL information DB 130. The method for generating PECs is, as described above, performed by the PEC generation unit 101, which is as an example of a division unit, where the full set of the address ranges of the rules recorded in the ACL information DB is divided into multiple PECs in accordance with the inclusion relations of the address ranges among the rules.

The PEC generation unit 101 records information about PEC in the PEC-DB 131. After having completed the recording of the information about PEC, the PEC generation unit 101 notifies the PEC extraction unit 102 of the completion. The PEC extraction unit 102 starts processing in response to the notification.

FIG. 6 illustrates an example of the PEC-DB 131. The PECs generated from the information stored in the ACL information DB 130 illustrated in FIG. 5 are recorded in the PEC-DB 131 of this example. For example, PEC numbers for identifying respective PECs and address of PECs corresponding to the respective PEC numbers are recorded in the PEC-DB 131. The address ranges are recorded in the same manner as specified in the above-described equations (1) to (4).

Referring back to FIG. 4, the PEC extraction unit 102, which is an example of an extraction unit, extracts from the multiple PECs in the PEC-DB 131 one or more PECs included in the address range of each of the rules in the ACL information DB 130. In the example in FIG. 2, the PEC extraction unit 102 extracts, with respect to the rule containing the source IP address 0.0.0.0/0 and the destination IP address ANY, the PEC{A} to PEC{D} that are included in the address range of the rule.

The PEC extraction unit 102 extracts, with respect to the rule having the source IP address 0.0.0.0/24" and the destination IP address ANY, the PEC{B} to PEC{D} that are included in the address range of the rule. The PEC extraction unit 102 extracts, with respect to the rule having the source IP address 0.0.0.64/28 and the destination IP address 0.0.0.64/30, the PEC{C} that is included in the address range of the rule, and extracts, with respect to the rule having the source IP address 0.0.0.96/28 and the destination IP address 0.0.0.32/30, the PEC{D} that is included in the address range of the rule.

The PEC extraction unit 102 obtains information about priority and the action of each rule from the ACL information DB 130. The PEC extraction unit 102 records the setting name, the priority, the action, and the PEC number of the extracted PEC for each rule in the ACL information management table 132. After having completed the recording, the PEC extraction unit 102 notifies the rule-disposition determination unit 103 of the completion. The rule-disposition determination unit 103 starts processing in response to the notification.

FIG. 7 illustrates an example of the ACL information management table 132. The ACL information management table 132 of this example is based on the ACL information DB 130 in FIG. 5 and the PEC-DB 131 in FIG. 6. A setting name, a priority (the smaller the number, the higher the priority), an action, one or more PECs number of the PECs included in the address range of a rule are recorded for each rule in the ACL information management table 132.

The aforementioned kinds of information are stored for each of the firewall 21 at the site #1 and the firewall 22 at the site #2 in the ACL information management table 132. For example, concerning the firewall 21, the priority and the action of the rule having the setting name FW1-1 are 1 and DENY/DROP, respectively, and the address range of the rule includes multiple PECs having the PEC numbers 2, 3, 8, 9, 16, 17, 25, and 26. Concerning the firewall 22, the priority and the action of the rule having the setting name FW2-1 are 1 and DENY/DROP, respectively, and the address range of the rule includes multiples PEC having the PEC numbers 3, 9, 17, and 26.

The rule-disposition determination unit 103, which is an example of a determination unit, calculates, with respect to each rule of the rules in the ACL information DB 130, an inclusion relation of the PECs between a particular rule and other rules assigned higher priority than the particular rule. In accordance with the calculation result, the rule-disposition determination unit 103 determines disposition for each of the rules. The rule-disposition determination unit 103 determines one of maintain, delete, and check/correct (check and correct) as disposition for a rule. The check/correct denotes that a user checks setting details of the rule and corrects the rule in accordance with the check result.

The rule-disposition determination unit 103 determines disposition for rules in accordance with the ACL information management table 132. For example, in a case where the rule-disposition determination unit 103, by referring to the PECs for each of the rules, determines that the address range of one rule is included in the address range of another rule assigned higher priority than the one rule, when the action of the one rule is identical to the action of the other rule, the rule-disposition determination unit 103 determines that the one rule is a redundant overlapping setting and determines deletion of the one rule. After having completed the determination of disposition for all rules, the rule-disposition determination unit 103 outputs information about the disposition for the respective rules and the inclusion relations of the PECs among the rules to the image data output unit 104. The image data output unit 104 starts processing in response to input of the information.

The image data output unit 104, which is an example of an output unit, outputs image data indicating the disposition for the respective rules and the inclusion relations of the PECs among the rules to the display device 16. The display device 16 displays an image based on the image data. Hence, it is possible for a user not only to check disposition for each rule by using the image on the display device 16, but also to visually check the inclusion relations of the address ranges among the rules per PEC unit.

The operation input processing unit 105 outputs to the image data output unit 104 operation input information in accordance with an operation input performed by a user via the input device 15. The image data output unit 104 alters the image in accordance with the operation input information. In such a manner, the image data output unit 104 and the operation input processing unit 105 provides a user with a graphical user interface (GUI).

Next, processing of the network management apparatus 1 is described.

Figure 8:
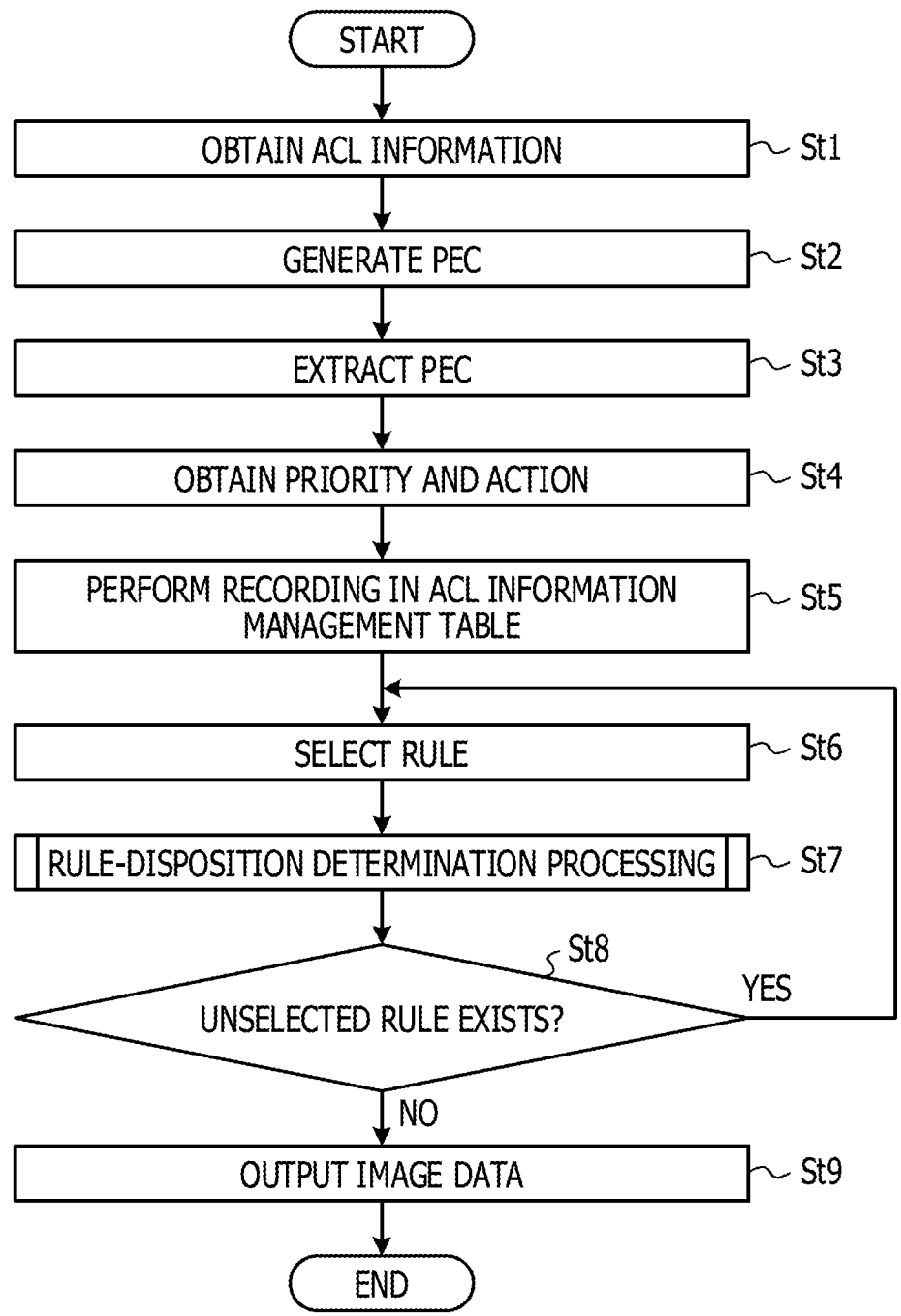
FIG. 8 is a flowchart illustrating an example of processing of a network management apparatus.

FIG. 8 is a flowchart illustrating an example of processing of the network management apparatus 1. The processing is performed by executing the network management program.

The ACL acquisition unit 100 obtains the ACL information from each of the firewalls 21 and 22 (step St1). The ACL information is recorded in the ACL information DB 130.

Subsequently, the PEC generation unit 101 generates the PEC from the address ranges of the rules in the ACL information DB 130 (step St2). The PEC number is assigned to the PEC and the PEC is recorded on the PEC-DB 131.

The PEC extraction unit 102 extracts the PEC included in the address ranges of the rules from the PEC-DB 131 (step St3). The PEC extraction unit 102 obtains the priority and the action of each rule from the ACL information DB 130 (step St4). The PEC extraction unit 102 records in the ACL information management table 132 the PEC number, the priority, and the action of the extracted PEC (step St5).

The rule-disposition determination unit 103 selects one rule from the ACL information management table 132 (step St6). The rule-disposition determination unit 103 performs the processing for determining disposition for the selected rule (rule-disposition determination processing) (step St7). Details of the rule-disposition determination processing will be described later.

The rule-disposition determination unit 103 determines whether any unselected rule exists in the ACL information DB 130 (step St8). In a case where any unselected rule exists (Yes in step St8), the rule-disposition determination unit 103 selects the unselected rule (step St6) and performs the processing in step St7 for the selected rule.

In a case where no unselected rule exists (No in step St8), the image data output unit 104 outputs to the display device 16 image data indicating the disposition for the respective rules and the inclusion relations of the address ranges represented by using the PEC (step St9). In such a manner, the network management apparatus 1 performs the processing.

Figure 9:
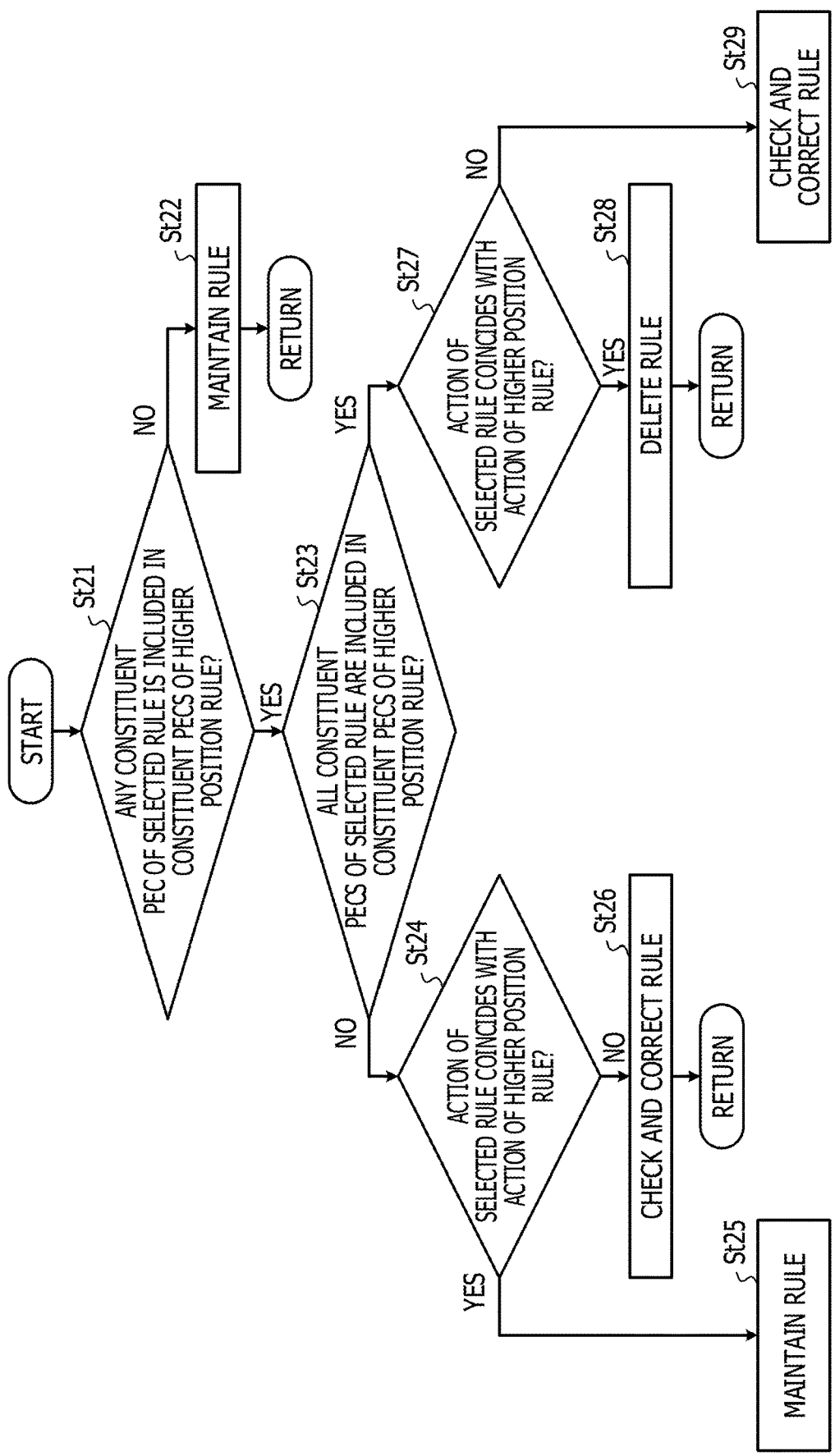
FIG. 9 is a flowchart illustrating an example of a rule-disposition determination processing.

FIG. 9 is a flowchart illustrating an example of the rule-disposition determination processing. The processing is performed in step St7 in FIG. 8. In the following description, the PEC included in the address ranges of the rules is referred to as a constituent PEC, which constitutes the address range. In this processing, the constituent PEC and the action are compared among different rules at different positions in the priority order, but target rules for comparison are in the same firewall 21 or the same firewall 22.

The rule-disposition determination unit 103 determines whether any of the constituent PECs of the selected rule is included in the constituent PECs of another rule (a higher position rule) assigned higher priority than that of the selected rule (step St21). In a case where no constituent PEC of the selected rule is included in the constituent PECs of the higher position rule (No in step St21), the rule-disposition determination unit 103 determines maintain as the disposition for the selected rule (step St22).

As described above, when any overlapping part does not exist between the address range of the selected rule and the address range of a higher position rule, the rule-disposition determination unit 103 determines that it is possible to control communication by employing the selected rule in a separate condition from the higher position rule, and thus determines the selected rule to be maintained. Subsequently, the rule-disposition determination unit 103 ends the processing.

In a case where any of the constituent PECs of the selected rule is included in the constituent PECs of a higher position rule (Yes in step St21), the rule-disposition determination unit 103 further determines whether all constituent PECs of the selected rule are included in the constituent PECs of the higher position rule (step St23). In this step, for example, the rule-disposition determination unit 103 determines whether there is any higher position rule whose constituent PECs includes all the constituent PECs of the selected rule. In a case where all the constituent PECs of the selected rule are included (Yes in step St23), the rule-disposition determination unit 103 compares the action of the selected rule with the action of the higher position rule (step St27). In this step, when multiple corresponding higher position rules exist, the action of the selected rule is compared with each of the actions of all the corresponding higher position rules.

In a case where the action of the selected rule coincides with the action of the higher position rule (Yes in step St27), the rule-disposition determination unit 103 determines delete as the disposition for the selected rule (step St28).

As described above, when the rule-disposition determination unit 103 determines that all constituent PECs of a rule is included in the constituent PECs of a higher position rule and the action of the rule coincides with the action of the higher position rule, the rule-disposition determination unit 103 determines delete as the disposition for the rule. As a result, the network management apparatus 1 is able to suggest to a user the deletion of a redundant rule that overlaps a higher position rule.

In a case where the action of the selected rule does not coincide with the action of the higher position rule (No in step St27), the rule-disposition determination unit 103 determines check and correct for setting details as the disposition for the selected rule (step St29).

For example, when the action of a higher position rule is PERMIT and the action of a selected rule is DENY/DROP, since lower priority is assigned to the selected rule (that is, a lower position rule), the action of the selected rule is not applied to a packet. In such a case, however, there may be a setting error in the selected rule, and thus, it is desired that the user checks the setting details of the rule and corrects the rule.

As described above, when the rule-disposition determination unit 103 determines that all constituent PECs of a rule are included in constituent PECs of a higher position rule and the action of the rule does not coincide with the action of the higher position rule, the rule-disposition determination unit 103 determines correct as the disposition for the rule. As a result, the network management apparatus 1 is able to suggest to a user correction of a contradictory rule that may include a setting error.

In a case where not all the constituent PECs of the selected rule are included in the constituent PECs of the higher position rule (in other words, in a case where any of the constituent PECs of the selected rule is not included in the constituent PECs of the higher position rule) (No in step St23), the rule-disposition determination unit 103 compares the action of the selected rule and the action of the higher position rule (step St24). In this step, when multiple corresponding higher position rules exist, the action of the selected rule is compared with each of the actions of all the corresponding higher position rules.

In a case where the action of the selected rule does not coincide with the action of the higher position rule (No in step St24), the rule-disposition determination unit 103 determines check and correct for setting details as the disposition for the selected rule (step St26).

For example, when the action of a higher position rule is PERMIT and the action of a selected rule is DENY/DROP, since lower priority is assigned to the selected rule, the action of the selected rule is not applied to a packet having the source IP address and the destination IP address within the address range that overlaps between the higher position rule and the selected rule. In such a case, however, there may be a setting error in the selected rule, and thus, it is desired that the user checks the setting details of the rule and corrects the rule.

As described above, when the rule-disposition determination unit 103 determines that any constituent PEC of a rule is not included in constituent PECs of a higher position rule and the action of the rule does not coincide with the action of the higher position rule, the rule-disposition determination unit 103 determines correct as the disposition for the rule. As a result, the network management apparatus 1 is able to suggest to a user correction of a contradictory rule that may include a setting error.

In a case where the action of the selected rule coincides with the action of the higher position rule (Yes in step St24), the rule-disposition determination unit 103 determines maintain as the disposition for the selected rule (step St25).

For example, when the action of a higher position rule and the action of a selected rule are both PERMIT, the action of the selected rule is applied to a packet having the source IP address and the destination IP address within the address range that does not overlap between the higher position rule and the selected rule. In this case, depending on the selected rule, it is possible that the same action as that of the higher position rule is applied under the condition different from the higher position rule.

In such a manner, the rule-disposition determination processing is performed. Hereinafter, by using the ACL information management table 132 in FIG. 7 as an example, examples of disposition determined in the rule-disposition determination processing are described.

First Example

In this example, it is assumed that the rule-disposition determination unit 103 selects the rule having the setting name FW1-1. The rule-disposition determination unit 103 determines whether the constituent PECs of the rule are included in constituent PECs of any higher position rule (step St21).

However, since the priority of the selected rule is 1, no higher position rule exists. As a result, no constituent PEC of the rule having the setting name FW1-1 is included in constituent PECs of any higher position rule (No in step St21), the rule-disposition determination unit 103 determines the rule to be maintained (step St22).

Second Example

In this example, it is assumed that the rule-disposition determination unit 103 selects the rule having the setting name FW1-2. The rule-disposition determination unit 103 determines whether any of the constituent PECs of the rule is included in the constituent PECs of the rule having the setting name FW1-1 (step St21).

The address range of the rule having the setting name FW1-2 is composed of the constituent PECs having the PEC numbers 3, 9, 17, and 26. The address range of the rule having the setting name FW1-1 is composed of the constituent PECs having the PEC numbers 2, 3, 8, 9, 16, 17, 25, and 26.

As seen in the constituent PECs, the constituent PECs having the PEC numbers 3, 9, 17, and 26 are common between the rule having the setting name FW1-2 and the rule having the setting name FW1-1; in other words, all the constituent PECs of the rule having the setting name FW1-2 are included in the constituent PECs of the rule having the setting name FW1-1, which is a higher position rule than the rule having the setting name FW1-2.

Accordingly, the rule-disposition determination unit 103 determines that any of the constituent PECs of the rule having the setting name FW1-2 is included in the constituent PECs of the rule having the setting name FW1-1 (Yes in step St21). Subsequently, the rule-disposition determination unit 103 determines that all the constituent PECs of the rule having the setting name FW1-2 are included in the constituent PECs of the rule having the setting name FW1-1 (Yes in step St23).

The rule-disposition determination unit 103 then compares the action of the rule having the setting name FW1-2 with the action of the rule having the setting name FW1-1 (step St27). The action of the rule having the setting name FW1-2 is PERMIT and the action of the rule having the setting name FW1-1 is DENY/DROP. According to this, the rule-disposition determination unit 103 determines that the actions do not coincide with each other (No in step St27), and the rule-disposition determination unit 103 determines check and correct for the rule having the setting name FW1-2 (step St29).

Third Example

In this example, it is assumed that the rule-disposition determination unit 103 selects the rule having the setting name FW1-4. The rule-disposition determination unit 103 determines whether any of constituent PECs of the rule is included in constituent PECs of the rules having the setting names FW1-1 to FW1-3 (step St21).

The address range of the rule having the setting name FW1-4 is composed of the constituent PECs having the PEC numbers 4, 5, 12, 14, 20, 22, 29, and 30. The address range of the rule having the setting name FW1-3 is composed of the constituent PECs having the PEC numbers 4, 14, 22, and 30.

As seen in the constituent PECs, the constituent PECs having the PEC numbers 4, 14, 22, and 30 are common between the rule having the setting name FW1-4 and the rule having the setting name FW1-3; in other words, some constituent PECs of the rule having the setting name FW1-4 are included in the constituent PECs of the rule having the setting name FW1-3, which is a higher position rule than the rule having the setting name FW1-4. No constituent PEC is common between the rule having the setting name FW1-4, and the rule having the setting name FW1-1 or the rule having the setting name FW1-2.

Accordingly, the rule-disposition determination unit 103 determines that any of the constituent PECs of the rule having the setting name FW1-4 is included in the constituent PECs of the rule having the setting name FW1-3 (Yes in step St21). Subsequently, the rule-disposition determination unit 103 determines that only some constituent PECs of the rule having the setting name FW1-4 are included in the constituent PECs of the rule having the setting name FW1-3 (No in step St23).

The rule-disposition determination unit 103 then compares the action of the rule having the setting name FW1-4 and the action of the rule having the setting name FW1-3 (step St24). The action of the rule having the setting name FW1-4 and the action of the rule having the setting name FW1-3 are both PERMIT. According to this, the rule-disposition determination unit 103 determines that the actions coincide with each other (Yes in step St24), and the rule-disposition determination unit 103 determines maintain for the rule having the setting name FW1-4 (step St25).

Fourth Example

In this example, it is assumed that the rule-disposition determination unit 103 selects the rule having the setting name FW2-3. The rule-disposition determination unit 103 determines whether any of the constituent PECs of the rule is included in the constituent PECs of the rules having the setting names FW2-1 and FW2-2 (step St21).

The address range of the rule having the setting name FW2-3 is composed of the constituent PECs having the PEC numbers 13, 15 to 20, and 22. The address range of the rule having the setting name FW2-1 is composed of the constituent PECs having the PEC numbers 3, 9, 17, and 26. The address range of the rule having the setting name FW2-2 is composed of the constituent PECs having the PEC numbers 1, 7 to 20, 22, and 23.

As seen in the constituent PECs, the constituent PECs having the PEC number 13, 15 to 20, and 22 are common between the rule having the setting name FW2-3 and the rule having the setting name FW2-2; in other words, all the constituent PECs of the rule having the setting name FW2-3 are included in the constituent PECs of the rule having the setting name FW2-2, which is a higher position rule than the rule having the setting name FW2-3. Between the rule having the setting name FW2-3 and the rule having the setting name FW2-1, only the constituent PEC having the PEC number 17 is common.

Accordingly, the rule-disposition determination unit 103 determines that any of the constituent PECs of the rule having the setting name FW2-3 is included in the constituent PECs of the rule having the setting name FW2-2 (Yes in step St21). Subsequently, the rule-disposition determination unit 103 determines that all the constituent PECs of the rule having the setting name FW2-3 are included in the constituent PECs of the rule having the setting name FW2-2 (Yes in step St23).

The rule-disposition determination unit 103 then compares the action of the rule having the setting name FW2-3 and the action of the rule having the setting name FW2-2 (step St27). The action of the rule having the setting name FW2-3 is DENY/DROP and the action of the rule having the setting name FW2-2 is also DENY/DROP. According to this, the rule-disposition determination unit 103 determines that the actions coincide with each other (Yes in step St27), and the rule-disposition determination unit 103 determines delete for the rule having the setting name FW2-3 (step St28).

Fifth Example

In this example, it is assumed that the rule-disposition determination unit 103 selects the rule having the setting name FW2-4. The rule-disposition determination unit 103 determines whether any of the constituent PECs of the rule is included in the constituent PECs of the rules having the setting names FW2-1 to FW2-3 (step St21).

The address range of the rule having the setting name FW2-4 is composed of the constituent PECs having the PEC numbers 7 to 30. As seen in the constituent PECs, the constituent PECs having the PEC number 7 to 20, 22, and 23 are common between the rule having the setting name FW2-4 and the rule having the setting name FW2-2; the constituent PECs having the PEC number 13, 15 to 20, and 22 are common between the rule having the setting name FW2-4 and the rule having the setting name FW2-3; and the constituent PECs having the PEC number 9, 17, and 26 are common between the rule having the setting name FW2-4 and the rule having the setting name FW2-1. In other words, some constituent PECs of the rule having the setting name FW2-4 are included in the constituent PECs of the rules having the setting names FW2-1 to FW2-3, which are higher position rules than the rule having the setting name FW2-4.

Accordingly, the rule-disposition determination unit 103 determines that any of the constituent PECs of the rule having the setting name FW2-4 is included in the constituent PECs of the rules having the setting names FW2-1 to FW2-3 (Yes in step St21). Subsequently, the rule-disposition determination unit 103 determines that only some constituent PECs of the rule having the setting name FW2-4 are included in the constituent PECs of the rules having the setting names FW2-1 to FW2-3 (No in step St23).

The rule-disposition determination unit 103 then compares the action of the rule having the setting name FW2-4 with the actions of the rules having the setting names FW2-1 to FW2-3 (step St24). The action of the rule having the setting name FW2-4 is PERMIT and the actions of the rules having the setting names FW2-1 to FW2-3 are all DENY/DROP. According to this, the rule-disposition determination unit 103 determines that the actions do not coincide with each other (No in step St24), and the rule-disposition determination unit 103 determines check and correct for the rule having the setting name FW2-4 (step St26).

As described above, the rule-disposition determination unit 103 determines, with respect to each rule, the inclusion relation of the constituent PECs between a particular rule and another rule having higher priority than the particular rule, compares the action of the particular rule with the action of the other rule, and, in accordance with the determination result of the inclusion relation and the comparison result of action, determines disposition for each rule. As a result, the network management apparatus 1 is able to determine appropriate disposition in accordance with not only the inclusion relations of the address ranges between rules in consideration of priority but also coincidence or non-coincidence between actions.

In the above-described examples, the actions of respective rules include both two kinds: PERMIT and DENY/DROP. However, it is considered that only one of the actions of PERMIT and DENY/DROP may be set to rules depending on the type of the firewalls 21 and 22 in some cases. In this case, for example, when only PERMIT is set to rules, a packet not satisfying the condition of the address ranges of the respective rules is considered as the explicit target for DENY/DROP and is accordingly discarded.

When the only one kind of action exists, the rule-disposition determination unit 103 determines the disposition for the selected rule without comparing the action of the selected rule with the action of any higher position rule. As a result, the processing in steps St24 and St27 is not performed. Accordingly, when the rule-disposition determination unit 103 determines No in the determination processing in step St23, the rule-disposition determination unit 103 determines the selected rule to be maintained (step St25), or when determining Yes, determines the selected rule to be deleted (step St28).

As described above, the rule-disposition determination unit 103 determines, with respect to each rule, the inclusion relation of the constituent PECs between a particular rule and another rule assigned higher priority than the particular rule, and in accordance with the determination result, determines the disposition for each rule. As a result, the rule-disposition determination unit 103 is able to determine appropriate disposition in accordance with the inclusion relations of the address ranges of rules in consideration of priority.

The image data output unit 104 outputs to the display device 16 image data indicating the disposition for respective rules determined in the rule-disposition determination processing and the inclusion relations of the constituent PECs among the rules determined in the rule-disposition determination processing. The display device 16 displays the image data on a screen. A display example of a screen is described below.

FIG. 10 illustrates a display example of a screen of the display device 16. As described above, a GUI is provided to the screen of the display device 16.

A window 40 illustrates an example of a window for displaying the rules in the ACL 330 of the firewall 21 and the disposition for each rule. Marks with reference numbers 400 and 401 respectively represent maintain, and check and correct of rule as an example. In this example, the disposition of check and correct is suggested for the rule having the setting name FW1-2, the disposition of maintain for other rules. Similarly to other kinds of disposition, another kind of mark is displayed for representing the disposition of delete, which is omitted in FIG. 10.

A field "PEC" for indicating constituent PECs is provided to the bottom row of the window 40. When a user clicks on the field of the rule having the setting name FW1-2 (see the dotted line area) by using, for example, a pointing device, such as a mouse, a window 41 is displayed.

On the bottom row of the window 41, the list of the PEC numbers of the constituent PECs constituting the address range of the rule having the setting name FW1-2 that has been clicked is displayed. With this configuration, it is possible for the user to check the address range by using the constituent PEC as a unit.

When a user clicks on the field of a PEC number by using the pointing device, a sub-window 411 is displayed, where it is possible to visually grasp the constituent PEC corresponding to the PEC number the field of which has been clicked. For example, when the field of the PEC number 26 is clicked, the address area of the constituent PEC corresponding to the PEC number 26 is displayed as an area of the sub-window 411 represented by diagonal hatching.

When the field of a rule in the window 41 is clicked by using the pointing device, the setting details 410 of the rule is displayed. For example, when a user clicks on the field of the rule having the setting name FW1-2 (see the dotted line area), "FW1-2 0.0.0.0/0 10.56.64.0/24 PERMIT" is displayed.

On the side of the field of each rule, the action of the rule is displayed by using "O" (PERMIT) or "x" (DENY/DROP). Since the action of the rule having the setting name FW1-2, which has been clicked on the window 40, is PERMIT, "O" is displayed. The action of the rule having the setting name FW1-1, whose constituent PECs include the constituent PECs of the rule having the setting name FW1-2, is displayed by using "x".

A field "Others" for an address group that is not set in the ACL 330 is provided to a row immediately above the PEC field. Since the firewalls 21 and 22 discard packets having an unset address range, "x" is displayed in the field of action for "Others".

Diagonal lines are displayed in a field 412 of action for the rule having the setting name FW1-1, where the diagonal lines denote that the constituent PECs of the rule having the setting name FW1-1 include the constituent PECs of the rule having the setting name FW1-2. In such a manner, it is possible for the user to check inclusion relations of the constituent PECs among rules.

As described above, the image data output unit 104 outputs image data indicating the disposition for the respective rules and the inclusion relations of the constituent PECs among the rules. Because the constituent PECs are each a mutually disjoint set, it is possible for a user without special knowledge of networking to easily and visually grasp the overlapping address range among rules in addition to checking the disposition for the respective rules.

Therefore, the network management apparatus, the network management method, the non-transitory computer-readable storage medium storing a program, and the network system according to the embodiment facilitate validation of security policies of network devices.

The above-described processing functionality is implemented by using a computer. In this case, there is provided a program containing written instructions for processing to be performed by functions included in a processing system. By executing the program on a computer, the processing functionality is implemented on the computer. The program containing the written instructions for processing may be recorded in a computer-readable storage medium (excluding a carrier wave).

When the program is distributed, for example, the program is sold in the form of a portable storage medium, such as a digital versatile disc (DVD), a compact disc read only memory (CD-ROM), in which the program is recorded. It is also possible to store the program in a storage device of a server computer and transfer the program from the server computer to another computer via a network.

The computer that executes the program, for example, stores in an own storage device the program recorded in the portable storage medium or the program transferred from the server computer. The computer reads the program from the own storage device and performs processing according to the program. The computer may read the program directly from the portable storage medium and perform processing according to the program. The program may be sequentially transferred from the server computer and the computer is able to sequentially perform processing according to the received program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A network management apparatus comprising:
a memory; and
a hardware processor coupled to the memory and configured to:
obtain multiple rules that each control communication in accordance with an address range of a packet, the multiple rules including a first rule which is received form a first apparatus and a second rule which is received form a second apparatus,
divide a full set of the address range of the multiple rules into multiple subsets that are mutually disjoint in accordance with inclusion relations of the address range among the multiple rules, each of the subsets being applying mutually different combination of the multiple rules,
extract, with respect to each rule of the multiple rules, one or more subsets that are included in the address range from the multiple subsets,
determine, with respect to each rule of the multiple rules, an inclusion relation of the one or more subsets between a particular rule and another rule of the multiple rules that is assigned higher priority than that of the particular rule and determine disposition for each of the multiple rules in accordance with a determination result of the inclusion relation of the one or more subsets, and
output image data indicating, with respect to each rule of the multiple rules, the disposition and the inclusion relation of the one or more subsets wherein
the hardware processor:
determines whether or not any of the particular rule is included in the another rule,
determines whether or not an action of the particular rule among the obtained actions matches an action of the another rule among the obtained actions,
determines, when the particular rule is not included in the another rule, maintain as the disposition for the particular rule,
determines, when a part of the particular rule is included in the another rule and the action of the particular rule matches the action of the another rule, maintain as the disposition for the particular rule,
determines, when all of the particular rule is included in the another rule and the action of the particular rule matches the action of the another rule, delete as the disposition for the particular rule, and
determines, when a part of the particular rule is included in the another rule and the action of the particular rule does not match the action of the another rule or when all of the particular rule is included in the another rule and the action of the particular rule does not match the action of the another rule, correct as the disposition for the particular rule.

2. The network management apparatus according to claim 1, wherein
the multiple rules each contain an action setting that indicates permission or denial of communication of the packet, and
the determining of disposition includes determining, with respect to each rule of the multiple rules, an inclusion relation of the one or more subsets between a particular rule and another rule of the multiple rules that is assigned higher priority than that of the particular rule, comparing the action setting of the particular rule with the action setting of the other rule, and determining disposition for each rule of the multiple rules in accordance with a determination result of the inclusion relation and a comparison result of the action setting.

3. The network management apparatus according to claim 2, wherein
the determining of disposition includes determining, with respect to each rule of the multiple rules, deletion of a particular rule as the disposition when all the one or more subsets of the particular rule are included in the one or more subsets of the other rule and the action setting of the particular rule coincides with the action of the other rule.

4. The network management apparatus according to claim 2, wherein
the determining of disposition includes determining, with respect to each rule of the multiple rules, correction of a particular rule as the disposition when all the one or more subsets of the particular rule are included in the one or more subsets of the other rule and the action setting of the particular rule does not coincide with the action of the other rule.

5. The network management apparatus according to claim 2, wherein
the determining of disposition includes determining, with respect to each rule of the multiple rules, correction of a particular rule as the disposition when at least one of the one or more subsets of the particular rule is not included in the one or more subsets of the other rule and the action setting of the particular rule does not coincide with the action of the other rule.

6. The network management apparatus according to claim 1, wherein
the hardware processor divides the full set of the address range of the multiple rules into multiple subsets that are mutually disjoint in accordance with inclusion relations between an address ranges, each of the address ranges correspond to the address range of each of the multiple rules.

7. The network management apparatus according to claim 1, wherein
the hardware processor:
determines the maintain as the disposition for the particular rule when all of address range of the particular rule is not included in the another rule and an action of the particular rule is different from an action of another rule,
determines the correct as the disposition for the particular rule when all of the address range of the particular rule is not included in the another rule and the action of the particular rule is same the action of another rule,
determines the correct as the disposition for the particular rule when all of the address range of the particular rule is included in the another rule and the action of the particular rule is different form the action of another rule, and determines the delete as the disposition for the particular rule when all of the address range of the particular rule is included in the another rule and the action of the particular rule is same the action of another rule.

8. A network management method comprising:

obtaining multiple rules that each control communication in accordance with an address range of a packet, the multiple rules including a first rule which is received form a first apparatus and a second rule which is received form a second apparatus;

dividing a full set of the address range of the multiple rules into multiple subsets that are mutually disjoint in accordance with inclusion relations of the address range among the multiple rules, each of the subsets being applying mutually different combination of the multiple rules;

extracting, with respect to each rule of the multiple rules, one or more subsets that are included in the address range from the multiple subsets;

determining, with respect to each rule of the multiple rules, an inclusion relation of the one or more subsets between a particular rule and another rule of the multiple rules that is assigned higher priority than that of the particular rule and determining disposition for each of the multiple rules in accordance with a determination result of the inclusion relation of the one or more subsets; and outputting image data indicating, with respect to each rule of the multiple rules, the disposition and the inclusion relation of the one or more subsets, wherein the determining the disposition includes:

determining whether or not any of the particular rule is included in the another rule, determining whether or not an action of the particular rule among the obtained actions matches an action of the another rule among the obtained actions, determining, when the particular rule is not included in the another rule, maintain as the disposition for the particular rule, determining, when a part of the particular rule is included in the another rule and the action of the particular rule matches the action of the another rule, maintain as the disposition for the particular rule, determining, when all of the particular rule is included in the another rule and the action of the particular rule matches the action of the another rule, delete as the disposition for the particular rule, and determining, when a part of the particular rule is included in the another rule and the action of the particular rule does not match the action of the another rule or when all of the particular rule is included in the another rule and the action of the particular rule does not match the action of the another rule, correct as the disposition for the particular rule.

9. The network management method according to claim 8, wherein the multiple rules each contain an action setting that indicates permission or denial of communication of the packet, and the determining of disposition includes determining, with respect to each rule of the multiple rules, an inclusion relation of the one or more subsets between a particular rule and another rule of the multiple rules that is assigned higher priority than that of the particular rule, comparing the action setting of the particular rule with the action setting of the other rule, and determining disposition for each rule of the multiple rules in accordance with a determination result of the inclusion relation and a comparison result of the action setting.

10. A non-transitory computer-readable storage medium storing a program that causes a processor included in a network management apparatus to execute a process, the process comprising:

obtaining multiple rules that each control communication in accordance with an address range of a packet, the multiple rules including a first rule which is received form a first apparatus and a second rule which is received form a second apparatus;

dividing a full set of the address range of the multiple rules into multiple subsets that are mutually disjoint in accordance with inclusion relations of the address range among the multiple rules, each of the subsets being applying mutually different combination of the multiple rules;

extracting, with respect to each rule of the multiple rules, one or more subsets that are included in the address range from the multiple subsets;

determining, with respect to each rule of the multiple rules, an inclusion relation of the one or more subsets between a particular rule and another rule of the multiple rules that is assigned higher priority than that of the particular rule;

determining disposition for each rule of the multiple rules in accordance with a determination result of the inclusion relation of the one or more subsets; and outputting image data indicating, with respect to each rule of the multiple rules, the disposition and the inclusion relation of the one or more subsets, wherein the determining the disposition includes:

determining whether or not any of the particular rule is included in the another rule, determining whether or not an action of the particular rule among the obtained actions matches an action of the another rule among the obtained actions, determining, when the particular rule is not included in the another rule, maintain as the disposition for the particular rule, determining, when a part of the particular rule is included in the another rule and the action of the particular rule matches the action of the another rule, maintain as the disposition for the particular rule, determining, when all of the particular rule is included in the another rule and the action of the particular rule matches the action of the another rule, delete as the disposition for the particular rule, and determining, when a part of the particular rule is included in the another rule and the action of the particular rule does not match the action of the another rule or when all of the particular rule is included in the another rule and the action of the particular rule does not match the action of the another rule, correct as the disposition for the particular rule.

* * * * *